(12) United States Patent
Yoshida et al.

(10) Patent No.: US 6,673,167 B2
(45) Date of Patent: Jan. 6, 2004

(54) POWER TRANSMISSION SHAFT

(75) Inventors: Kazuhiko Yoshida, Shizuoka-ken (JP); Hiroaki Makino, Shizuoka-ken (JP); Akira Wakita, Shizuoka-ken (JP)

(73) Assignee: NTN Corporation, Shizuoka-Ken (JP)

( * ) Notice: Subject to any disclaimer, the term of this patent is extended or adjusted under 35 U.S.C. 154(b) by 0 days.

(21) Appl. No.: 09/972,945

(22) Filed: Oct. 10, 2001

(65) Prior Publication Data

US 2002/0017343 A1 Feb. 14, 2002

Related U.S. Application Data

(62) Division of application No. 09/493,189, filed on Jan. 28, 2000, now Pat. No. 6,319,337.

(30) Foreign Application Priority Data

Feb. 10, 1999 (JP) ................................................ 11-33070
Feb. 18, 1999 (JP) ................................................ 11-40339

(51) Int. Cl.[7] ............................................. C22C 38/00
(52) U.S. Cl. ....................................... 148/328; 148/902
(58) Field of Search ................................. 148/572, 902, 148/904, 328

(56) References Cited

U.S. PATENT DOCUMENTS 4,173,501 A * 11/1979 Hildebrandt et al. ........ 148/319
5,545,267 A   8/1996 Ochi et al. ................... 148/335

FOREIGN PATENT DOCUMENTS

JP        407090379 A      4/1995

* cited by examiner

Primary Examiner—Deborah Yee
(74) Attorney, Agent, or Firm—Arent Fox Kintner Plotkin & Kahn, PLLC

(57) ABSTRACT

The power transmission shaft 12 is made by applying induction hardening to carbon steel with hardening ratio in a range from 0.25 to 0.50. For the carbon steel, one containing 0.39 to 0.49% of C, 0.4 to 1.5% of Si, 0.4 to 1.0% of Mn, 0.025% or less S, 0.02% or less P and 0.01 to 0.1% of Al by weight as the basic components, with the rest comprising Fe and inevitable impurities is used. This makes it possible to achieve higher strength and lighter weight of the power transmission shaft.

4 Claims, 4 Drawing Sheets

POWER TRANSMISSION SHAFT

This is a divisional of Application No. 09/493,189 filed Jan. 28, 2000 now U.S. Pat. No. 6,319,337 filed Nov. 20, 2001. The disclosure of the prior application is hereby incorporated by reference herein in its entirety.

BACKGROUND OF THE INVENTION

The present invention relates to a power transmission shaft used in apparatuses such as automobiles and industrial machines to transmit torque, and more particularly to a power transmission shaft used in a constant velocity joint.

The present invention also relates to a power transmission shaft that transmits torque via splines or serration.

A power transmission shaft, for example the drive shaft of an automobile, is usually made of carbon steel that is subjected to heat treatment in order to harden the surface thereof, thereby ensuring a predetermined level of strength. Recently, as the automobiles tend to have increasing output power and the vehicle weight increases in order to meet higher safety requirements, the drive shaft is required to have increasingly higher strength. On the other hand, the drive shaft is required to be lighter in weight in order to improve the fuel saving efficiency, which also imposes a pressing need to increase the strength of the drive shaft.

In order to increase the load bearing capacity of a shaft, it is common to increase the strength of the material by increasing the carbon content of the material or other means. With this approach, strength can be increased in smooth-surfaced portions although notched portions such as serration tend to be subjected to quenching crack or other abnormality, leading to lower strength, contrary to the intended purpose. A torsion test was conducted on a serration shaft, and breakage mode was analyzed. The analysis showed that the material is subject to shear fracture when the carbon content is low, but the principal stress becomes dominant as the carbon content increases and the material breaks due to the principal stress (ratio of inter-granular rupture increases). This result also shows the necessity for further inter-granular enhancement of the steel structure. Increasing the carbon content also leads to deterioration of machinability such as forging and cutting.

Accordingly, a first object of the present invention is to further increase the strength and decrease the weight of the power transmission shaft used in a constant velocity joint, without compromising the machinability.

Power transmission shafts for transmitting torque are used in many mechanical components in such apparatuses as automobile and industrial machinery. Among power transmission shafts, spline shafts and serration shafts that transmit high torque, in particular, are manufactured by applying surface hardening treatment such as carburizing, induction hardening or nitriding and/or heat treatment such as thermal refining to medium-carbon steel or low alloy steel to increase the strength of the shaft, while taking into consideration the ease of plastic processing, machinability and cost.

Recently, as the concern about the global environmental issues increases, stricter regulations on the automobile emissions and improved fuel saving efficiency are being called for, and accordingly measures to reduce the weight of the automobile have been taken in order to meet these requirements. Spline shafts and serration shafts are widely used for the drive shaft and propeller shaft of automobiles for coupling with constant velocity joints, and reduction of the weight of the spline shafts and serration shafts makes a great contribution to the weight reduction of an automobile. Thus there is a strong requirement for increasing the strength of these shafts both in terms of static strength and fatigue strength.

Hence a second object of the present invention is to increase the static strength and fatigue strength of a power transmission shaft having torque transmitting teeth such as spline or serration.

SUMMARY OF THE INVENTION

In order to achieve the first object described above, the present invention provides a power transmission shaft which is suitable for a power transmission shaft having notched portion such as torque transmitting teeth, particularly for a power transmission shaft used in a constant velocity joint, and which is made of a carbon steel that is subjected to induction hardening to achieve a hardening ratio in a range from 0.25 to 0.50. As the carbon steel described above, such a material is used that contains 0.39 to 0.49% of C, 0.4 to 1.5% of Si, 0.4 to 1.0% of Mn, 0.025% or less S, 0.02% or less P, and 0.01 to 0.1% of Al by weight as basic components, with the rest comprising Fe and inevitable impurities.

The hardening ratio is given by the effective depth of hardened layer divided by the radius of shaft. When this ratio is lower than 0.25, strength of the shaft decreases because breakage starts inside the shaft (core). When the ratio is higher than 0.50, on the other hand, quenching crack occurs in notched portions such as serration.

Among the elements described above, C content lower than 0.39% leads to insufficient strength due to a low surface hardness achieved by induction hardening, and C content higher than 0.49% leads to lower strength due to excessively high hardness that results in increased notch sensitivity of the notched portion. FIG. 3 shows measurements of the static torsional strength as a function of carbon content, indicating that sufficient strength (about 1600 Mpa of failing stress) can be obtained when the carbon content is within the range described above.

Si is added as a deoxidizing agent and for the purpose of enhancement of grain boundary during the steel making process. When Si content is lower than 0.4%, the effect of grain boundary enhancement cannot be obtained. When Si content is higher than 1.5%, cold workability (ease of forging and cutting by turning) lowers significantly.

Mn content is required to fix sulphur content of the steel in the form of MnS and diffuse it. When Mn content is lower than 0.4%, hardenability becomes lower (sufficient depth of hardening cannot be obtained). When Mn content is higher than 1.0%, effect of hardenability reaches a plateau resulting in lower cold workability.

S, existing in the form of MnS inclusion by bonding with Mn, may become the start point of cracking during cold working, and therefore the content thereof is kept 0.025% or lower. Content of P, that precipitates in the grain boundaries of steel thereby to lower hot workability and decrease the material strength, is kept to 0.02% or less.

Al, used as a deoxidization agent to remove oxygen included in the steel by being oxidized during the steel making process and for the purpose of controlling the grain size, is contained with a concentration not less than 0.01%. Since a high concentration of oxide lowers the toughness and the oxide may become the start point of crack during cold working, Al content is kept within 0.10%.

When ferrite grains in steel structure are too large, quenching crack sensitivity increases remarkably and therefore ferrite grain size number (JIS G0552) of the carbon steel is set to 7 or higher. The grain size number refers to a unit representing a number of grains included in unit area or unit volume of a polycrystal material. It is generally represented by the grain size number determined from measurement of the unit area. The grain size can be measured in, for example, a core portion of the shaft where the thermal effect of induction hardening has not reached.

The carbon steel includes 0.001 to 0.004 weight percent of B, 0.02 to 0.05 weight percent of Ti and 0.008 weight percent or less N, with the ratio of Ti/N not less than 3.4.

B is added for the purpose of improving the hardenability, grain boundary enhancement and reduction of quenching crack sensitivity. When B content is less than 0.001%, these effects cannot be obtained sufficiently and, when B content is higher than 0.004%, BC is formed in the grain boundaries thus lowering the strength. Ti is added for the purpose of fixing N through the formation of TiN, and thereby preventing the formation of BN. When Ti content is lower than 0.02%, formation of BN cannot be prevented and, when Ti content is higher than 0.05%, cleanliness of the steel deteriorates thus leading to lower strength. While N is included in the steel as an impurity, content thereof higher than 0.008% leads to the formation of BN that cancels out the effect of adding B. Ratio of Ti/N is a weight ratio of the Ti content to the N content and indicates what part of the N content would be fixed by Ti. The higher this ratio, the less becomes the amount of BN to be formed. Ti/N ratio less than 3.4 makes it difficult to secure effective B content.

Adding 0.4 or lower weight percent of Mo improves hardenability of the carbon steel. When the Mo content exceeds 0.4%, effect of improving hardenability reaches a plateau.

Adding one or more element selected from among Nb, V and Zr to carbon steel improves the toughness of the steel through refining of crystal grains, which is effective in adapting the steel to more severe conditions of use. When the total content of these elements is lower than 0.01 weight percent, sufficient effect of improving the toughness cannot be achieved and, when the total content is higher than 0.3 weight percent, toughness deteriorates.

Fatigue strength can be improved by generating residual compressive stress of 60 kgf/mm$^2$ or higher in the surface that has been subjected to induction hardening. Fatigue strength can be improved further by applying shot peening after applying induction hardening, thereby to increase the residual compressive stress in the surface to 100 kgf/mm$^2$ or higher.

The present invention described above makes it possible to provide a power transmission shaft having higher strength than conventional ones, thus making it possible to increase the load bearing capacity and reduce the weight, and that at a low cost since carbon steel is used. Also according to the present invention, it is not necessary to use high carbon steel, and machinability is not compromised.

From a research conducted by the inventors of the present application in conjunction with the second object described above, the following findings have been obtained in relation to the strength of a serration shaft.

(1) Static strength (torsional strength) of a smooth-surfaced portion is lower than that of a serrated portion. Fatigue strength of a smooth-surfaced portion is, on the contrary, higher than that of a serrated portion.

(2) Rupture mode of a serration shaft is dominated by shear rupture in a smooth-surfaced portion but dominated by bending stress in a serrated portion.

Allowable shear stress of a steel is in general significantly lower than allowable bending stress. Thus it is deduced from the findings (1) and (2) that increasing the strength of a serration shaft requires it to increase the strength, particularly static strength, of the smooth-surfaced portion.

According to the present invention, based on the consideration described above, the smooth-surfaced portion and the serrated portion are hardened to different depths. Specifically, in a power transmission shaft that has a smooth-surfaced portion and torque transmitting teeth that are induction-hardened and is used in a constant velocity joint, effective depth of hardened layer in the smooth-surfaced portion of the least diameter is made greater than effective depth of the torque transmitting teeth of a small diameter.

The "effective depth of hardened layer" herein refers to the "effective induction-hardened layer" defined in JIS G0559 as the depth of a hardened layer that has hardness higher than a predetermined level. Lower limit of hardness increases with the carbon content in the steel, and hardness of carbon steel S40C (JIS code), for example, is said to be 41 HRC or higher.

The following findings have also been obtained from the research conducted by the inventors.

(3) Static strength of a smooth-surfaced portion increases in proportion to the hardening ratio (effective depth of hardened layer/shaft radius). That is, static strength of a smooth-surfaced portion increases as the depth of hardening increases.

(4) Static strength of a serrated portion increases substantially in proportion to the hardening ratio in a range of the latter up to 0.65, although decreases as the hardening ratio increases beyond 0.65.

(5) Fatigue strength of a serrated portion increases substantially in proportion to the hardening ratio in a range of the latter up to 0.55, although the residual compressive strength decreases as the hardening ratio increases beyond 0.55, leading to lower fatigue strength and more likeliness of quenching crack to occur.

The findings (3) through (5) were obtained from a "tapered-up" shaft comprising a serrated portion 1a, having shaft diameter ratio (outer diameter of smooth-surfaced portion/minor diameter of serrated portion) in a range from 0.95 to 1.05 inclusive and consisting of a minor diameter portion 10 and a major diameter portion 11, with the minor diameter portion 10 on one end thereof (the end on the center side of the shaft 1) being enlarged smoothly and connected to the circumferential surface of the shaft 1.

From the findings (3) through (5), it is presumed that the static strength can be increased by increasing the hardening depth of the smooth-surfaced portion. For the serrated portion, deep hardening that results in a hardening ratio higher than 0.55 leads to lower fatigue strength and is therefore not desirable.

Thus, according to the present invention, the shaft diameter ratio (diameter of the smooth-surfaced portion of the least diameter/minor diameter of the torque transmitting teeth) is set in a range from 0.95 to 1.05 inclusive, hardening ratio γs of the torque transmitting teeth is set in a range from 0.20 to 0.55 inclusive, and hardening ratio of the smooth-surfaced portion of least diameter is set to (γs+0.2) or higher.

The shaft diameter ratio is set in the range from 0.95 to 1.05 inclusive, because the static torsional rupture strength specified in JASO (Japanese Automobile Standard Organization) C304–89 cannot be maintained when the shaft diameter ratio is lower than 0.95 while the allowable operation angle specified in JASO C304–89 cannot be maintained when the shaft diameter ratio is higher than 1.05. The hardening ratio γs of the torque transmitting teeth is set in the range from 0.20 to 0.55 inclusive, because stable hardening ratio and stable surface hardness cannot be obtained due to unstable heating temperature when the value of γs is less than 0.20 and quenching crack becomes more likely to occur when the value of γs is greater than 0.55. The hardening ratio of the smooth-surfaced portion of the least diameter is set to (γs+0.2) or higher, because the smooth-surfaced portion becomes more likely to experience fatigue fracture with the strength thereof being lower than that of the torque transmitting teeth.

In the drive system of a vehicle such as automobile, one end of a drive shaft is coupled with a differential gear via a constant velocity joint, with the other end being coupled with an axle via a constant velocity joint. The drive shaft has three smooth-surfaced portions, one in a boot (outboard boot) of the constant velocity joint on the outboard side (axle side), one in a boot (inboard boot) of the constant velocity joint on the inboard side (differential side), and the other at an intermediate portion therebetween. According to the present invention, among these smooth-surfaced portions, that in the outboard boot is formed with the least diameter thereby designating the weakest portion. This makes it possible to reduce the variations in the strength of the drive shaft and reduce the time required to apply migratory hardening.

Many of the conventional power transmission shafts are manufactured without applying the effect of heat treatment to the core in order to avoid defects such as quenching crack. Even in such cases as the core is subjected to the effect of heat, most of the core has turned into martensite and therefore the residual compressive stress on the surface has diminished. According to the present invention, on the contrary, effect of heat is applied to the core as well but the core is prevented from transforming into martensite, by forming the core of the smooth-surfaced portion of the least diameter in 2-phase structure of ferrite and martensite. As a consequence, high strength is achieved and residual compressive stress remains on the surface thus making it possible to achieve higher fatigue strength as well. In order to cause the effect of heat to reach the core, it is preferable to carry out induction hardening a plurality of times (for example, twice).

Fatigue strength can be improved further by applying shot peening after induction hardening thereby to increase the residual compressive stress in the surface of the torque transmitting teeth to 100 kgf/mm$^2$ or higher. In order to achieve this, it is preferable to carry out the shot peening operation twice.

The present invention described above provides the power transmission shaft having higher strength than the conventional ones, and makes it possible to reduce the weight and increase the load bearing capacity of the power transmission shaft. It is also made possible to employ a greater operating angle.

DETAILED DESCRIPTION OF THE PREFERRED EMBODIMENTS

Figure 2:
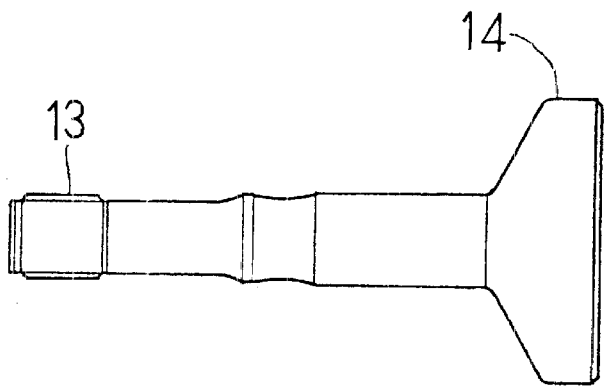
FIG. 2 is a side view of a pressure-welded stub.
Figure 3:
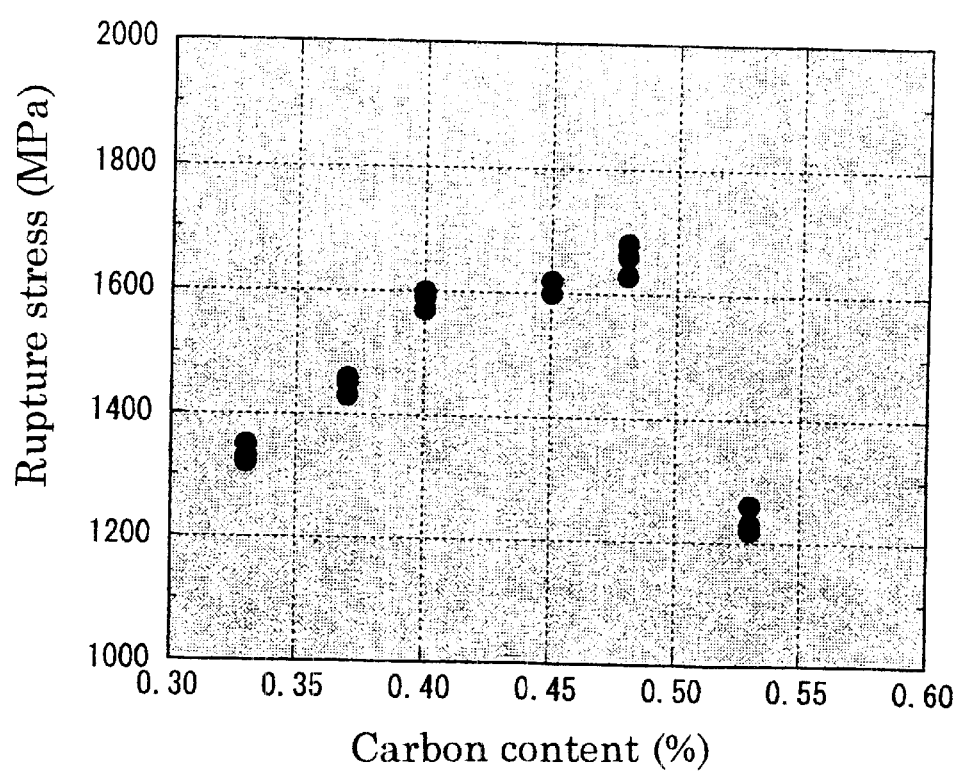
FIG. 3 is a diagram showing the effect of carbon content on the static torsional strength.

First embodiment of the present invention will now be described with reference to FIG. 1 through FIG. 3.

Figure 1A:
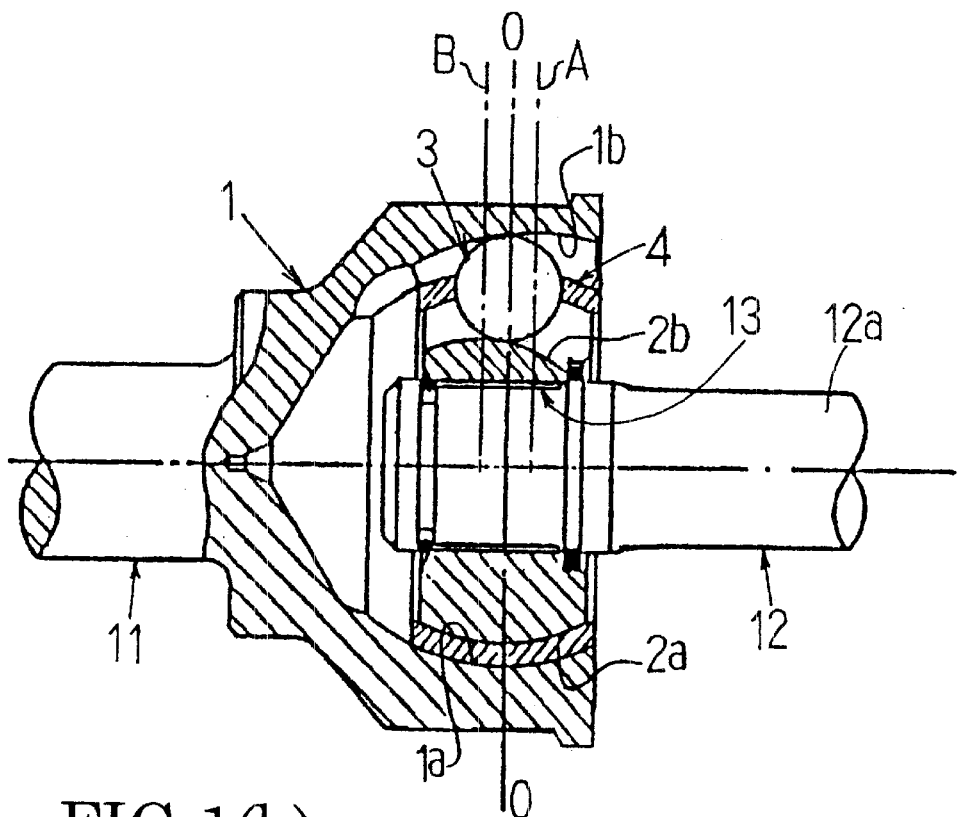
FIG. 1(a) is a longitudinal sectional view showing a Rzeppa type constant velocity joint (section along line C—C in FIG. 1(b))
Figure 1B:
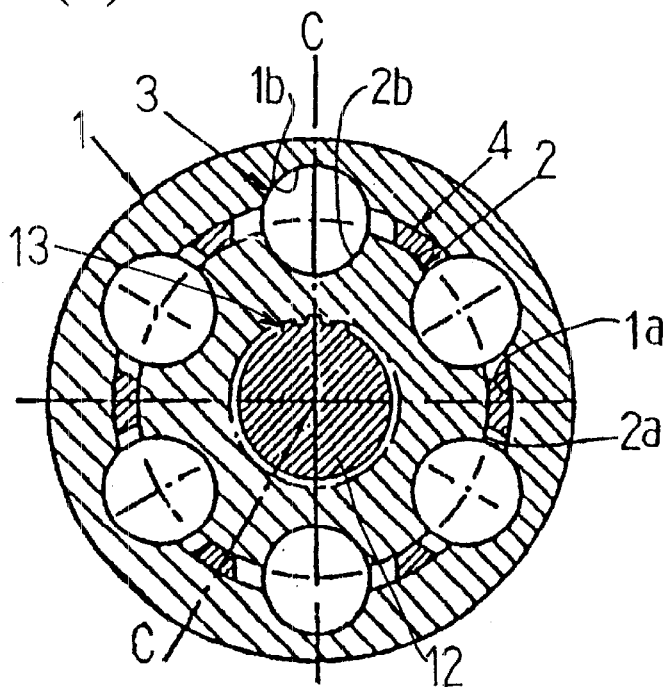
FIG. 1(b) is a cross sectional view of FIG. 1(a).

FIG. 1 shows a Rzeppa type constant velocity joint (ball-fixed joint) as an example of constant velocity joint. This constant velocity joint comprises an outer member 1 (outer race) that has a plurality of (normally six) curved guide grooves 1b formed in the axial direction on a spherical inner circumference 1a thereof, an inner member 2 (inner race) that has a plurality of (normally six) curved guide grooves 2b formed in the axial direction on a spherical outer circumference 2a thereof, a plurality of (normally six) torque transmitting balls 3 arranged in ball tracks formed by the guide grooves 1b of the outer member 1 and the guide grooves 2b of the inner member 2, and a cage 4 that holds the torque transmitting balls 3.

Center A of the guide grooves 1b of the outer member 1 and center B of the guide grooves 2b of the inner member 2 are offset to the opposite sides of the center plane 0 of the joint that includes the centers of the torque transmitting balls 3 by the same distances in the axial direction. Consequently, the ball track has a wedge shape that is wider on the side of opening and gradually reduces toward the recess side. The centers of both spheres of the inner circumference 1a of the outer member 1 that is the guide face of the cage 4 and the outer circumference 2a of the inner member 2 correspond with the center plane 0 of the joint. When the outer member 1 and the inner member 2 make an angular displacement of θ, the torque transmitting balls 3 guided by the cage 4 are always held in the bisecting plane (θ/2) of the angle θ, for any operation angle θ, so that a constant velocity of rotation of the joint can be maintained.

Formed at the bottom of mouth of the outer member 1 integrally therewith is a first shaft portion 11, or alternatively a separate shaft portion is joined therewith by proper means. Also connected to the inner circumference of the inner member 2 via torque transmitting teeth 13 such as serration is a second shaft portion 12. One of the shaft portions 11, 12 works as the driving shaft of which drive force is transmitted by the torque transmitting balls 3 to the other one of these shafts that works as the driven shaft.

The second shaft portion 12 that is serration-coupled with the inner member 2 is made of a carbon steel (medium carbon steel) containing C: 0.39 to 0.49%, Si: 0.4 to 1.5%, Mn: 0.4 to 1.0%, S: 0.025% or less, P: 0.02% or less, Al: 0.01 to 0.1% (all in weight percent) as the basic components, with the rest comprising Fe and inevitable impurities.

As described previously, this carbon steel preferably includes 0.001 to 0.004% of B, 0.02 to 0.05% of Ti and 0.008% or less N, with Ti/N ratio being 3.4 or greater and ferrite grain size number being 7 or greater. The carbon steel may also include, as required, 0.4 weight percent or lower of Mo and/or 0.01 to 0.3 weight percent of one or more elements selected from Nb, V and Zr.

This carbon steel is subjected to induction hardening after being forged into a predetermined shape, to achieve hardening ratio in a range from 0.25 to 0.50 and residual compressive stress of 60 kgf/mm² or higher in the surface. This level of residual compressive stress can be achieved by controlling the annealing temperature, or changing or adjusting the quenching liquid (water, oil, etc.). It is desirable to increase the fatigue strength further by applying shot peening after induction hardening thereby to increase the residual compressive stress in the surface of the torque transmitting teeth to 100 kgf/mm² or higher. This level of residual compressive stress can be achieved by applying shot peening twice. Shot peening is basically applied to the toque transmitting teeth 13, but may be applied also to the smooth-surfaced portion 12a.

While the foregoing description concerns the second shaft portion 12, the configuration described above may be applied also to the first shaft portion 11 in case the first shaft portion is formed separately from the outer member 1. Moreover, in addition to the shaft portions 11, 12, the configuration may also be applied to a power transmission shaft linked or coupled with a constant velocity joint such as pressure-welded stub or welded stub, whether the shaft is hollow or solid. FIG. 2 shows a pressure-welded stub as an example, that has a torque transmitting teeth 13 (serration) provided on one end thereof for coupling with the inner member 2 and a flange 14 provided on the other end for pressure-welding a steel pipe thereon.

The present invention is not limited to the Rzeppa type constant velocity joint shown in FIG. 1, and can be applied widely to other types of constant velocity joints such as the double-offset type constant velocity joint and the tripod type constant velocity joint.

Second embodiment of the present invention will now be described below with reference to FIG. 4 and FIG. 5.

Figure 4:
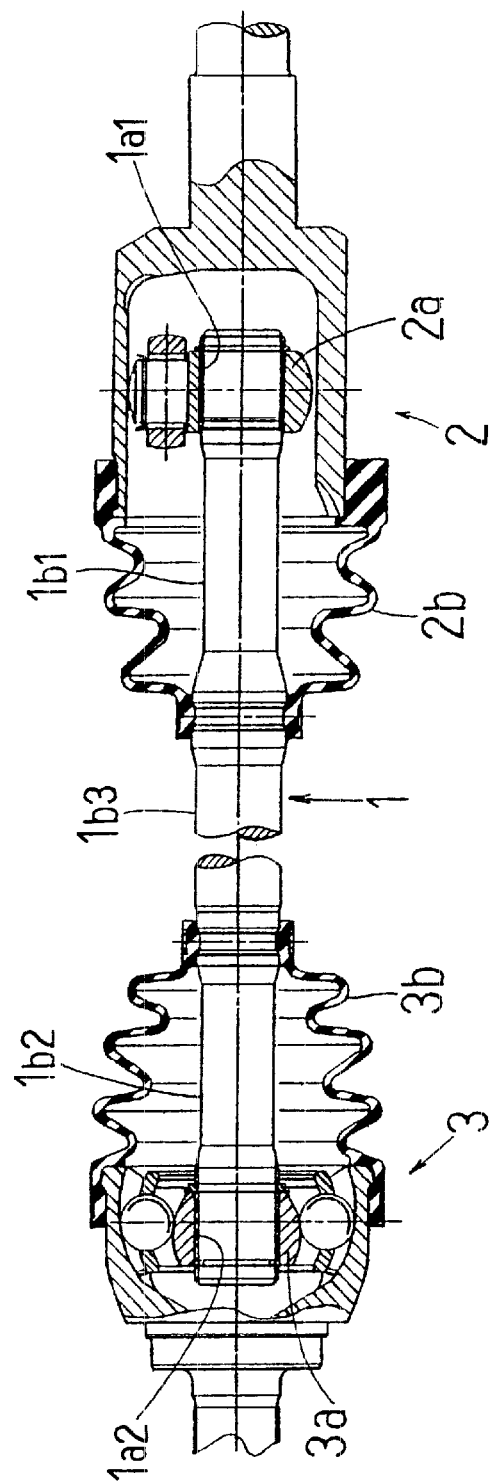
FIG. 4 is a sectional view of a drive shaft.
Figure 5:
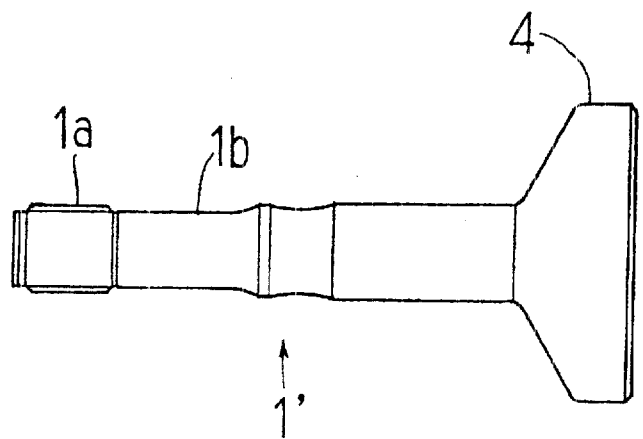
FIG. 5 is a side view of a pressure-welded stub.
Figure 6A:
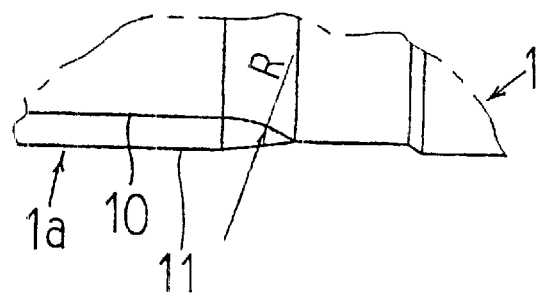
FIG. 6(a) is a longitudinal sectional view showing a serrated portion.
Figure 6B:
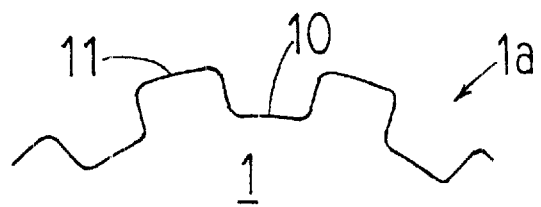
FIG. 6(b) is a cross sectional view showing a serrated portion.

FIG. 4 shows a drive shaft of an automobile, both ends of the drive shaft 1 being connected to a drive system via constant velocity joints 2, 3. In the case of the example shown, the inboard side is linked to a differential gear not shown via a sliding tripod type constant velocity joint 2, while the outboard side is linked to an axle not shown via a Rzeppa type constant velocity joint 3. The constant velocity joints on both ends of the drive shaft 1 are not limited to the combination shown in the example, and various types of constant velocity joint may be used in an appropriate combination. For example, double-offset type constant velocity joint, cross-groove type constant velocity joint or the like can be used on the inboard side, while fixed tripod type constant velocity joint or the like can be used on the outboard side.

The drive shaft 1 has a first serrated portion 1a1 and a second serrated portion 1a2 that serve as torque transmitting teeth being formed on either end thereof. Of the two serrated portions 1a1, 1a2, the first serrated portion 1a1 is serration-fitted in the inner circumference of an inner member (tripod member 2a in the example shown) of the inboard side joint 2 and the second serrated portion 1a2 is serration-fitted in the inner circumference of an inner member (inner race 3a in the example shown) of the outboard side joint 3.

Formed on the shaft center side of the serrated portions 1a1, 1a2, namely on the outboard side of the first serrated portion 1a1 and on the inboard side of the second serrated portion 1a2 are a first smooth-surfaced portion 1b1 and a second smooth-surfaced portion 1b2 both having circular cross sections adjoining the serrated portions 1a1, 1a2, respectively. Also a third smooth-surfaced portion 1b3 having circular cross section is formed between the smooth-surfaced portions 1b1, 1b2. Among the three smooth-surfaced portions 1b1 through 1b3, the first smooth-surfaced portion 1b1 and the second smooth-surfaced portion 1b2 are housed in a boot 2b of the inboard side joint 2 and in a boot 3b of the outboard side joint 3, respectively. In this embodiment, the second smooth-surfaced portion 1b2 housed in the outboard boot 3b is formed to have the least diameter in the drive shaft 1, with the shaft diameter ratio (outer diameter of the second smooth-surfaced portion 1b2/ minor diameter of the second serrated portion 1a2) being set in a range from 0.95 to 1.05.

In a process to manufacture the drive shaft 1, a carbon steel, for example a medium carbon steel in a range somewhere from S40C to S45C, is forged into a form and, after cold-processing (for example, cold forging or cold rolling) of the serrated portions 1a1, 1a2, induction hardening is applied to the entire shaft. At this time, hardening ratio γs of the second serrated portion 1a2 (effective depth of hardened layer/radius of the minor diameter portion 10) is set in a range from 0.20 to 0.55, and hardening ratio of the second smooth-surfaced portion 1b2 (effective depth of hardened layer/radius of second smooth-surfaced portion 1b2) is set to (γs+0.2) or greater. In the hardening process, effect of the heat is caused to reach the core (especially the core of the second smooth-surfaced portion 1b2) thereby to form 2-phase structure of ferrite and martensite in the core. In order to cause the effect of heat to reach the core, it is preferable to carry out the hardening operation twice. However, 2-phase structure can also be formed in the core with a single hardening process by, for example, heating with power supply of a lower frequency, heating over a longer period of time in the case of high frequency or taking a longer time (lag time) after the end of heating before cooling.

Upon completion of hardening, it is preferable to increase the fatigue strength further by applying shot peening thereby to increase the residual compressive stress in the surface to 100 kgf/mm² or higher. This value of residual compressive stress can be achieved by applying shot peening twice. Shot peening may be applied either to the drive shaft 1 as a whole or only to the first serrated portion 1a1 and/or the second serrated portion 1a2 where particularly high fatigue strength is required.

While the foregoing description deals with the relationships between the second smooth-surfaced portion 1b2 having the least diameter and the second serrated portion 1a2 that adjoins the former, similar relationships (shaft diameter ratio, effective depth of hardened layer, hardening ratio, etc.) may also be applied between the first smooth-surfaced portion 1b1 and the first serrated portion 1a1. Also similar relationships may be applied between the third smooth-surfaced portion 1b3 and the first serrated portion 1a1 or the second serrated portion 1a2.

The drive shaft 1 has been described above as the power transmission shaft, although scope of the present invention is not limited to the drive shaft and may be applied widely to power transmission shafts used as driving shafts or driven shafts of constant velocity universal joint such as pressure-welded stub or welded stub. FIG. 5 shows a pressure-welded stub 1' as an example that has a torque transmitting teeth 1a (serrated portion) provided on one end thereof for coupling with an inner member of constant velocity universal joint and a flange 4 provided on the other end for pressure-welding a steel pipe thereon. In this case, too, relationships (shaft diameter ratio, effective depth of hardened layer, hardening ratio, etc.) similar to those described above can be applied between the serrated portion 1a and the smooth-surfaced portion 1b of the least diameter that adjoins the former.

What is claimed is:

1. A power transmission shaft, used in a constant velocity joint, said shaft having an induction-hardened smooth-surfaced portion and an induction-hardened torque transmitting teeth portion, wherein effective depth of hardened layer of the smooth-surfaced portion having the least diameter is set to be greater than the effective depth of hardened layer of a minor diameter portion of the torque transmitting teeth portion and wherein the core of the smooth-surfaced portion of the least diameter has a structure including ferrite and martensite and an effect of heat is caused to reach the core.

2. A power transmission shaft according to claim 1 wherein ratio of the diameter of the smooth-surfaced portion of the least diameter to the minor diameter of the torque transmitting teeth portion is set in a range from 0.95 to 1.05 inclusive, hardening ratio $\gamma s$ of the torque transmitting teeth portion is set in a range from 0.20 to 0.55 inclusive, and hardening ratio of the smooth-surfaced portion of the least diameter is set to ($\gamma s+0.2$) or greater.

3. A power transmission shaft according to claim 1 or 2 wherein the smooth-surfaced portion of the least diameter is provided in an outboard boot.

4. A power transmission shaft according to claim 1 or 2 wherein shot peening is applied thereby to increase the residual compressive stress in the surface of the torque transmitting teeth to 100 kgf or higher.

* * * * *